April 15, 1952     M. MAROSHICK     2,593,045

FISHING REEL

Filed Feb. 21, 1951

Inventor
MAX MAROSHICK

By Thomas W. J. Clark

Attorney

Patented Apr. 15, 1952

2,593,045

UNITED STATES PATENT OFFICE 2,593,045

FISHING REEL

Max Maroshick, Baltimore, Md.

Application February 21, 1951, Serial No. 212,127

6 Claims. (Cl. 242—84.5)

This invention relates to improvements in anti-backlash fishing reels having automatic means preventing overrunning of the spool when slack occurs in the line.

It is a particular object of the invention to provide a dual action brake wherein the braking surfaces are associated with oppositely rotating parts of the same system.

It is a further object to apply a moving or rotating brake to the surface of the member whose motion is to be stopped.

It is a further object of the invention to provide a novel reel spool shifting mechanism for actuating the brake which is unusually simple, rugged and easily adjustable.

Other objects and advantages of the invention will be apparent from the following description and the accompanying drawings in which.

In the drawings similar numerals refer to similar parts throughout the several views.

Figure 1:
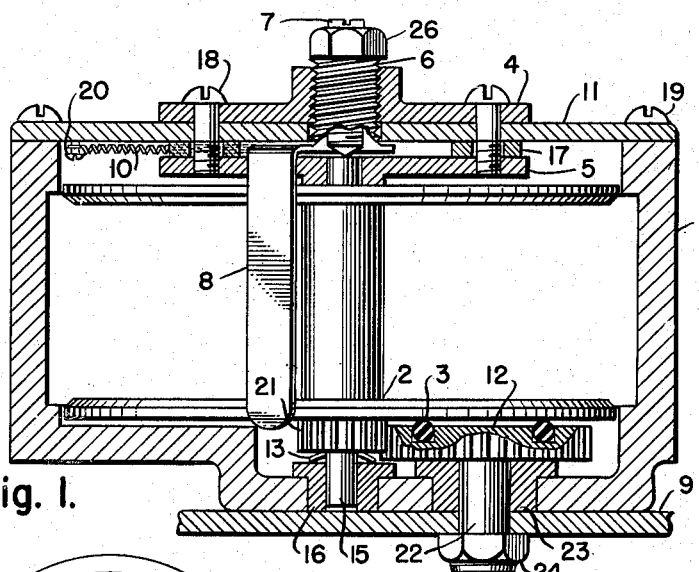
Figure 1 is a horizontal sectional view of the fishing reel, with the line drop finger almost in braking position.

A reel housing 1 has therein a reel spool 2 carried by a rigidly inserted shaft 15. One end of this shaft is mounted in a bearing 16 in one side of the housing 1. The other end of the shaft is mounted in a bearing plate 5, spaced from cover plate 11 by washers 17, and held therein by screws 18 also holding the nut plate 4 to the cover plate 11, which is held on the housing by screws 19.

An angular line drop finger 8 is rockingly mounted in nut plate 4 by means of threaded tubular stud 6.

Figure 4:
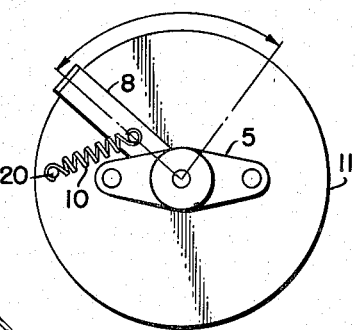
Figure 4 is a diagrammatic side view of certain of the parts looking from the handle side of the reel with the spool and housing proper removed.
Figure 3:
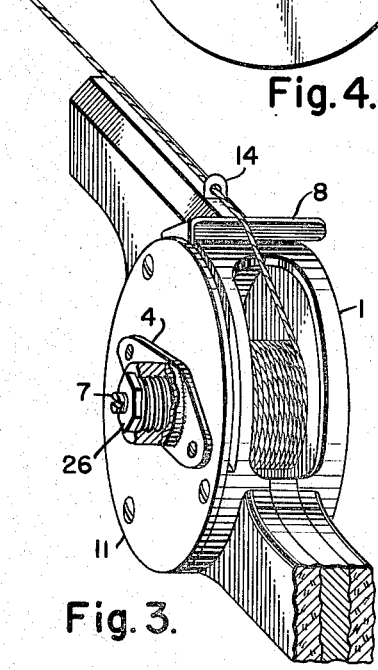
Figure 3 is a perspective view of the reel.

A spring 10 connected to finger 8 and to pin 20 in plate 11 urges the arm rearwardly into the braking position shown in Figures 1 and 4. While the line is being played off the spool, as in casting, the line rocks the line drop finger 8 forwardly to the position shown in Figure 3 against the action of the spring 10. Eye bracket 14 on the housing 1 guides the line against the finger 8.

Figure 2:
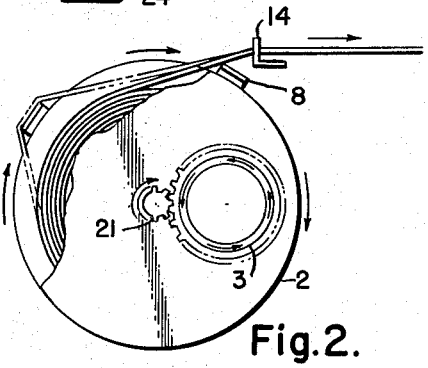
Figure 2 is a diagrammatic side view of the reel from the handle side.
Figure 5:
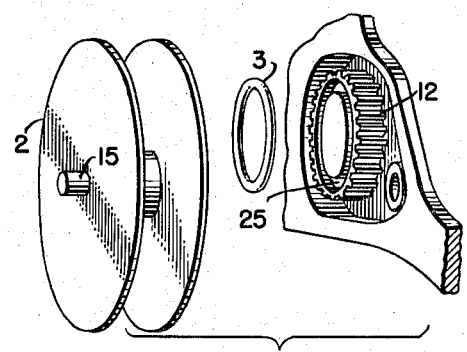
Figure 5 is an exploded perspective view of certain of the parts involved in braking.

An adjusting set screw 7 extends through stud 6 and abuts the end of shaft 15, and is locked in place in stud 6 by lock nut 26. As the line drop finger 8 is retracted to braking position by spring 10, the stud 6 and set screw 7 are moved inwardly relative to the nut plate 4, shifting the spool 2 and gear 21 on shaft 15 axially against spring washer 13. The gear 12 on shaft 22 fitting in bearing 23 in the housing 1 has an inner annular channel 25 in the side wall, Figure 5, into which fits an annular rubber braking member 3. As indicated in Figure 2, this braking member is rotating counter-clockwise with gear 12 while the spool is rotating clockwise. The spool, when it is fully shifted to braking position, contacts the braking member in such a manner that a resultant anti-rotational torque is exerted by the surface of the braking member traveling oppositely to the surface of the spool. Likewise the spool surface exerts a braking force on the braking member 3 which brakes gear 21 and the spool through gear 12. It will be apparent that at the outer diameter of the reel spool, the brake member 3 is rotating in the opposite direction, applying a strong braking action both to the gear 12 and the spool 2. A handle 9 is affixed to shaft 22 by nut 24.

What is claimed as new and is desired to be secured by Letters Patent is:

1. In a fishing reel, a shaft, a reel spool fixedly mounted on said shaft, said reel spool having an outer braking surface, a housing mounting said shaft for axial shifting, said housing having adjacent one end of said shaft an internally threaded opening axially aligned with said shaft, a line drop finger, an externally and internally threaded tubular stud threaded into said opening and connecting with said line drop finger to rock therewith, a set screw in said tubular stud abutting said shaft, a first gear fixed to the other end of said shaft, a spring washer between said gear and housing on said shaft urging said shaft against said set screw, a second gear meshing with said first gear and mounted by said housing, an annular brake member carried concentrically of said second gear on the side of the gear adjacent said spool braking surface, rotating movement of said line drop finger shifting said spool axially against the action of said spring washer to bring the spool braking surface into contact with the braking member to brake the spool and the second gear.

2. In a fishing reel, a shaft, a reel spool fixedly mounted on said shaft, a housing mounting said shaft for axial shifting, a line drop finger, threaded means connected to said line drop finger and engaging said housing and actuated by the rocking of said line drop finger to shift said spool shaft axially, a first gear and a spring washer on an end of said shaft, a second gear meshing with said first gear and mounted by said housing, an annular brake member axially mounted on the side of said second gear adjacent said spool, said spring washer urging said spool away from said braking member, and said line drop finger shifting said spool by said threaded means against said spring washer to engage said spool and braking member.

3. In a fishing reel, a housing, a shaft, a reel spool mounted on the shaft and in said housing for axial shifting, a line drop finger mounted by said housing for rocking movement, means connected to said line drop finger for translating rocking movement thereof into axial shifting of said spool, a first gear on one end of said spool, a second gear rotatably mounted by said housing and meshing with said first gear, an annular braking member in the side wall of said second gear toward the spool and in the path of axial shifting of said spool for braking contact with said spool to doubly retard rotation thereof.

4. In a fishing reel, a housing, a shaft therein, a reel spool mounted rigidly on said shaft for axial shifting in the housing, a line drop finger mounted in said housing for rocking movement, means connected to said line drop finger for translating rocking movement thereof into axial shifting of said spool, a first gear on one end of said shaft, a second gear for transmitting torque to said first gear and mounted by said housing in the path of axial shifting of said spool, and a braking member carried by said second gear for braking contact with said spool.

5. In a fishing reel, a shaft, a reel spool mounted fixedly on said shaft, and having a braking surface, a housing providing bearings for said shaft in which the shaft is axially shiftable, a nut plate on the outside of said housing having a threaded opening axially aligned with one end of said shaft, a stud threadedly engaging said nut plate in said opening, means connected to said stud engaging said one end of said shaft, a line drop finger connecting with said stud to rock the stud to shift the shaft axially, a gear on the other end of the shaft, a further gear for transmitting torque to said shaft gear and mounted by said housing in the path of axial shifting of said spool, a brake member carried by said further gear contacting the braking surface of the spool when the spool is axially shifted for dual braking action.

6. In a fishing reel, a housing, a shaft, a reel spool mounted on the shaft and in said housing for axial shifting, said reel spool having an outer braking surface, a line drop finger mounted by said housing for rocking movement, means connected to said line drop finger for translating rocking movement thereof into axial shifting of said spool, a moving braking member in the path of the braking surface of said reel spool upon imparting axial shifting to the spool, means connected with the spool to continuously impart movement to the braking member until the rotation of the spool has stopped.

MAX MAROSHICK.

REFERENCES CITED

The following references are of record in the file of this patent:

UNITED STATES PATENTS

| Number | Name | Date |
|---|---|---|
| 496,654 | Heskett | May 2, 1893 |
| 1,888,087 | Jacobsen | Nov. 15, 1932 |

FOREIGN PATENTS

| Number | Country | Date |
|---|---|---|
| 919,548 | France | Dec. 9, 1946 |